A. CHMELA.
JUNCTION BOX.
APPLICATION FILED JAN. 26, 1916.
1,238,885.
Patented Sept. 4, 1917.
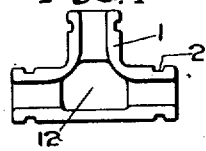
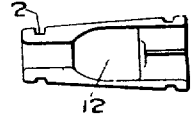
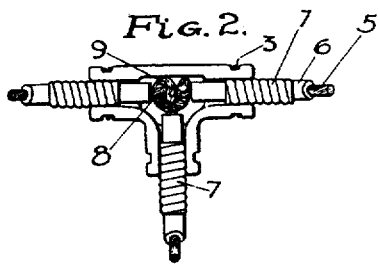
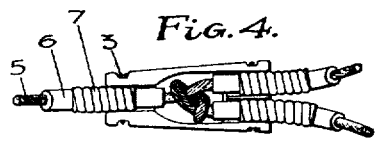
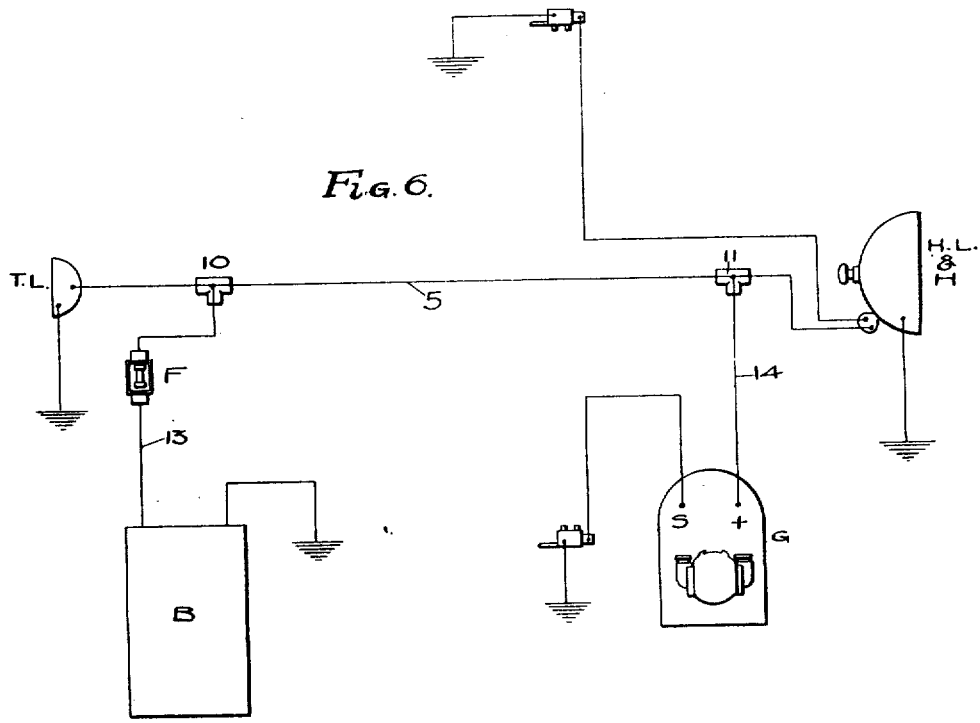
WITNESSES:
Ernest Lane.
L. P. Smith
INVENTOR.
ALBERT CHMELA
BY Albion D. F. Libby
ATTORNEY.

UNITED STATES PATENT OFFICE.

ALBERT CHMELA, OF NEWARK, NEW JERSEY, ASSIGNOR TO SPLITDORF ELECTRICAL COMPANY, OF NEWARK, NEW JERSEY.

JUNCTION-BOX.

1,238,885.  Specification of Letters Patent.  Patented Sept. 4, 1917.

Application filed January 26, 1916. Serial No. 74,420.

*To all whom it may concern:*

Be it known that I, ALBERT CHMELA, a citizen of the United States, residing in Newark, county of Essex, State of New Jersey, have invented certain new and useful Improvements in Junction-Boxes, of which the following is a specification.

My invention relates to an improved form of a junction box whereby the union between various branches of electric cables may be protected by means of a box that is adapted to be opened and inspected easily. My device is particularly useful for wiring, such as used in connection with moving vehicles, like automobiles and motor-cycles, and particularly the latter where space is an important factor. In wiring up the lamps, battery and dynamo on a motor-cycle the simplest method has been found to run one main lead straight through from the head light to the tail light and connect the battery and dynamo onto this main lead wire at the shortest distance from the battery and dynamo in accordance with their location on the vehicle. In order to make such connections it has been found advisable to use junction boxes, and on account of the lack of space the ordinary junction boxes have been found to be too cumbersome and hard to locate. My improvement is directed to furnishing a junction box which is very small and neat, and one that can be readily taken apart for the purpose of inspecting or making the necessary joints from the main cable to the various branches. Other and further objects of my invention will be apparent to one skilled in the art after an inspection of the attached specifications and drawing, in which Figure 1 is one-half of a T-shaped junction box. Fig. 2 illustrates the cables laid in the junction box of Fig. 1. Fig. 3 is a modified form of junction box, and Fig. 4 is the junction box of Fig. 3 showing the method of making a connection to the main cable from one end of the junction box. Fig. 5 is a view of the resilient member used for holding the two portions of the junction box together. Fig. 6 is a diagrammatic view of a wiring set used on a certain type of motor-cycle in which two T-shaped junction boxes are used.

Referring now particularly to the drawing, 1 is one-half of a junction box having channels 2 into which the ring 3 snaps after the main cables have been put in place, as illustrated in Figs. 2 and 4, the ring 3 is preferably made a complete turn or more so when it is slipped back from the box it will be supported on the cable and is then not likely to become lost. 12 is a depression within each of the parts 1, which, when in working position, form a recess. 5 illustrates the main conductor having insulation 6 and a metallic cover 7 over the insulation 6. In making a connection to the main cable 5, the covering 6 is removed for a certain distance exposing the insulation 6 which is also cut away as indicated at 8. The cable 9, which is desired to be attached to cable 5, has the protecting cover 7 removed and the insulation in the usual manner, and a joint made as indicated at 9. The two parts of the junction box 1 are then placed in position over the main and branch cables and the rings 3 snapped into position. It is thus seen that joint 9 is readily accessible by unsnapping the rings 3 and removing one or both portions of the junction box. It is also seen that the two parts being made as they are of molded insulating material give sufficient protection to the joint 9 without being obliged to tape this joint after the splice has been made, thus saving time and material.

The junction box shown in Figs. 3 and 4 provides for a main cable passing through the junction box and a branch cable passing out of the junction box in the same direction as one end of the main cable. In Fig. 6 the junction boxes are indicated by 10 and 11, the main conductor 5 passes straight through from the tail lamp to the head lamp, and the junction box 10 is placed at the nearest point to the battery B with a fuse F being inserted in lead 13 running to the battery. From junction box 11 a branch wire 14 leads to the generator G.

It will be apparent that other modifications of the junction box can be made to suit the requirements of the wiring scheme; hence I do not wish to be limited to the exact form shown.

Having thus described my invention what I claim is:

1. A junction box having two parts substantially alike of insulating material, a depression at the central portion of each part adapted to form a recess, grooves leading outward from said recess and adapted to receive electrical cables which are adapted to be spliced within said recess, annular channels around the exterior of said parts and near the end of said grooves, quick detachable means consisting of substantially complete rings adapted to be snapped over and around said parts for holding them together in fixed relationship against said cables.

2. In a device of the class described, the combination of two pieces of insulating material each having a depression at the center adapted to form a recess, a plurality of grooves leading outward from said recess, electrical cables adapted to lie in said grooves and to be joined together within said recess, resilient means adapted to snap over and around said pieces to normally hold said pieces together whereby when said resilient means are forced off the insulating pieces for the purpose of inspecting the joint within the recess they will be supported on said cables, and means on the exterior of said pieces for holding said resilient means in normal operative position.

In witness whereof, I affix my signature.

ALBERT CHMELA.

Copies of this patent may be obtained for five cents each, by addressing the "Commissioner of Patents, Washington, D. C."